United States Patent [19]
Moon

[11] Patent Number: 4,741,305
[45] Date of Patent: May 3, 1988

[54] OIL FILTER BY-PASS CROWN PART

[76] Inventor: Shi W. Moon, Woosung Apartment 2-310, Sadang-dong, Dongjak-ku, Seoul, Rep. of Korea

[21] Appl. No.: 836,956

[22] Filed: Mar. 6, 1986

[30] Foreign Application Priority Data

Mar. 27, 1985 [KR] Rep. of Korea ............ 85-3179[U]

[51] Int. Cl.$^4$ ............................................. F02M 1/00
[52] U.S. Cl. ............................ 123/196 A; 210/444
[58] Field of Search ................... 123/196 R, 196 A; 210/444, 440, 130, 132, 133, 168

[56] References Cited

U.S. PATENT DOCUMENTS

| 4,048,071 | 9/1977 | Yamada et al. | 210/130 |
| 4,454,036 | 6/1984 | Suzuki | 210/440 |

Primary Examiner—E. Rollins Cross
Attorney, Agent, or Firm—Ladas & Parry

[57] ABSTRACT

In the case of the present invention, however, in order to solve the lube oil supply problem, it sets up a by-pass crown part (10) connected to the inner pipe on the upside(14) of inner pipe part and increases the amount of oil passing through the filtering element by connecting vertical oil pressure directly to tissue element(15) and delays the direct operation of inflowing oil by adopting the horizontal by-pass method.

1 Claim, 3 Drawing Sheets

OIL FILTER BY-PASS CROWN PART

(b) is a vertical sectional view of the by-pass crown part connected to the inner pipe.

(a') is a lube oil intake route of the by-pass crown part connected to the inner pipe.

(b') is an incoming route of the inner pipe in which lube oil passes through tissue element.

Figure 1:
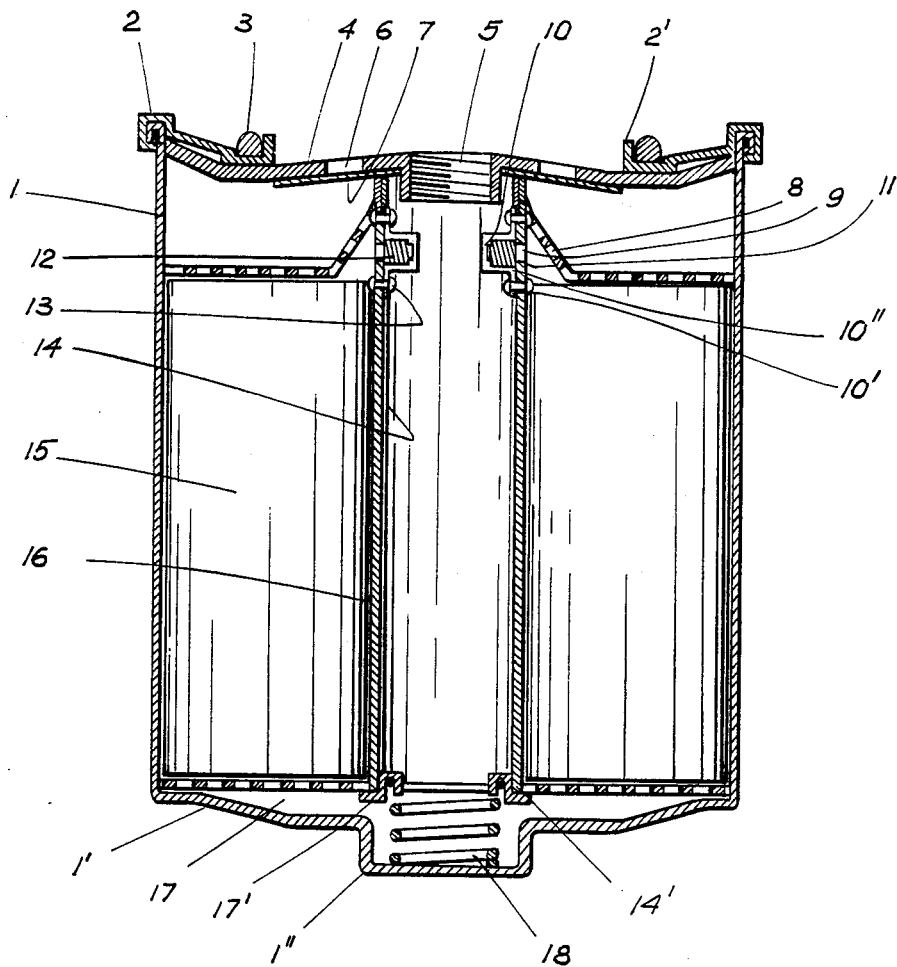
FIG. 1 is a vertical sectional view of the present invention which uses a by-pass crown part connected to an inner pipe.
Figure 2A:
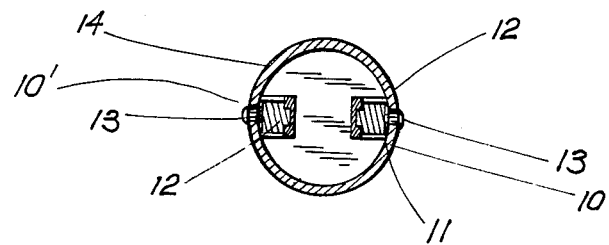
FIG. 2(a) is a plane figure of the by-pass crown part connected to the inner pipe.
Figure 2B:
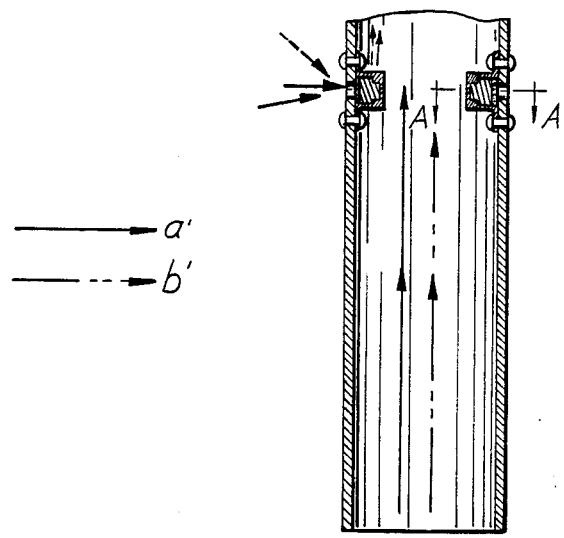
Figure 3A:
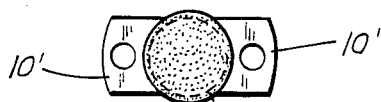
Figure 3B:
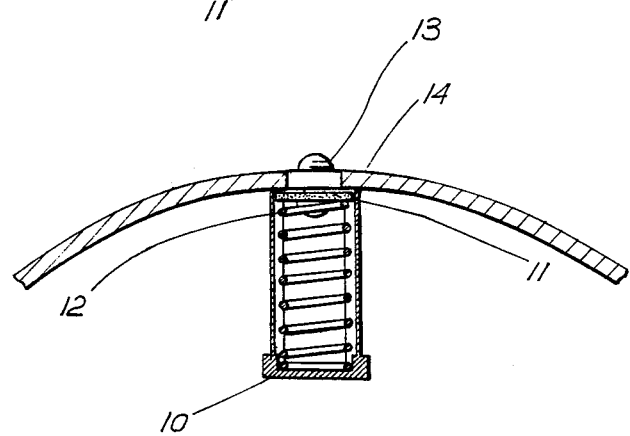
Figure 3C:

FIG. 3(a) is a plan figure of FIG. 2(b) (A).

(b) is a front view of FIG. 2(b) (A).

(c) is a bottom view of FIG. 2(b) (A).

*An explanation of the letterings on the drawings

1: An outer case
1': A part supporting the tissue element of outer case.
1": A part using an octagonal projection tool
2: A sealing part
2': A rugged part with an O ring fixed in.
3: An O ring
4: An upper cap
5: A fixing screw part
6: A lube oil inlet
7: A back flow-preventing annular rubber plate
8: An upper filtering net
9: A by-pass lube oil intake hole
10: A by-pass crown part connected to the inner pipe
10': A piece connected to the inner pipe of by-pass crown part
10": A passing groove
12: A by-pass pressure control spring
13: A connection riveting part
14: An inner pipe part
15: A tissue element(special celluroid paper roll)
16: A tissue element crown part
17: A lower filtering net
17': A lower concave groove of the inner pipe part
18: A spring in the lower part

DETAILED DESCRIPTION OF THE INVENTION

The present invention aims to solve the lube oil supply problem arising during the operation of an internal combustion engine. It is devised to prevent the unnecessary waste of fuel and the pollution caused by the combustion of pollutants by reducing friction and wear within the engine, protecting the engine through smooth operation and maximizing its efficiency.

The existing cartridge oil filter is found defective because it fails to achieve a fast passage through its filtering element by the inflowing oil pressure, an earlier start and a proper lube oil supply during high-speed running. As it adopts the method by which a great portion of supplied oil is horizontally filtered against the vertical oil pressure, the supplied oil tends to by-pass the folded filtering element directly by means of the vertical operation of oil pressure rather than to pass it through.

Accordingly, unfiltered oil flows into the engine and increases the effect of engine wear and friction caused by sludge, metal powder and various carbonic components and pollutants are produced by the internal combustion of the engine.

In the case of the present invention, however, in order to solve the lube oil supply problem, it sets up a bypass crown part (10) connected to the inner pipe on the upside (14) of inner pipe part and increases the amount of oil passing through the filtering element by connecting vertical oil pressure directly to tissue element(15) and delays the direct operation of inflowing oil by adopting the horizontal by-pass method.

When an explanation is given to it according to Figures shown in the drawings attached hereto, it comes as follows:

When the unfiltered oil which flows into its inlet(6) passes through the upper filtering net(8) and directly through the by-pass lube oil intake hole(9) and pushes the by-pass valve(11), the by-pass pressure control spring(12) contracts and opens the passing groove(10") and allows by-passing. The unfiltered lube oil which flows into its inlet(6) can also be made to pass through the upper filtering net(8) and tissue element(15) and proceed to the engine through the inner pipe part(14).

(Refer to FIG. 2(b))

An oil filter must be made to play its greatest role in reducing friction and wear by passing as much engine oil through the filtering element to filter off all the impurities contained therein and by supplying it quickly to the engine. This means that the amount of by-passing lube oil is reduced and the amount of lube oil passing through the filtering element is increased, so long as no trouble is involved in the engine.

However, the cartridge oil filter which uses the folded paper as a filtering element fails to achieve the filtering of as much engine oil, as it adopts the horizontal filtering method against the inflowing vertical oil pressure and connects oil pump pressure directly to the folded filtering paper, and a large amount of oil tends to by-pass together its impurities because the by-pass crown part is vertically fixed at the bottom of the oil filter and vertical oil pressure is connected directly thereto.

The present invention adopts the vertical filtering method against the vertical oil pressure by making some changes in such filtering and by-passing method. It is so devised as to properly control the amount of oil in a horizontal by-passing manner. Accordingly, the engine oil which became turbid due to lubricational action within the engine filters off its impurities by passing through the tissue element(15) and is then supplied in a clear and clean condition. Thus, it reduces pollution caused by the combustion of pollutants within the engine thanks to oily film formed between piston and cylinder. Smooth engine operation is contributable to the machine's life and fuel economization.

What is claimed is:

1. A filter comprising:
   an outer case having a top and a bottom;
   a filter element disposed in said outer case to form a space at said top and said bottom, said filter element having a central passage;
   a flow tube in said central passage, said flow tube being connected to said top of said outer case to close the space at the top of said case from said passage;
   means for introducing a fluid to be filtered into said top space, said fluid passing axially through said filter element into said bottom space and then into said flow passage; and
   a bypass valve in said top space and connected to said flow passage, said bypass valve being in a substantially radial direction of said flow passage.

* * * * *